United States Patent [19]

Swenson et al.

[11] Patent Number: 5,894,856
[45] Date of Patent: Apr. 20, 1999

[54] SEISMICALLY TRIGGERED VALVE

[76] Inventors: Ralph R. Swenson, P.O. Box 1249, Coulterville, Calif. 95311; Dale Dean, 900 S. Victory Blvd., Burbank, Calif. 91502

[21] Appl. No.: 08/909,900

[22] Filed: Aug. 12, 1997

[51] Int. Cl.$^6$ .................................................. F16K 17/36
[52] U.S. Cl. ............................ 137/38; 137/629; 251/65
[58] Field of Search ....................... 137/38, 629; 251/65

[56] References Cited

U.S. PATENT DOCUMENTS

| | | | |
|---|---|---|---|
| 266,132 | 10/1882 | Goodrich | 251/287 |
| 2,692,606 | 10/1954 | Stepanian | 137/38 |
| 2,703,582 | 3/1955 | Stepanian | 137/38 |
| 3,541,945 | 11/1970 | Wexler | 251/65 X |
| 4,513,629 | 4/1985 | Keller et al. | 137/38 |
| 4,603,591 | 8/1986 | Sibley et al. | 137/38 X |
| 4,640,303 | 2/1987 | Greenberg | 137/38 |
| 5,115,829 | 5/1992 | Franzke | 137/38 |
| 5,209,454 | 5/1993 | Engdahl et al. | 137/38 X |

*Primary Examiner*—Gerald A. Michalsky
*Attorney, Agent, or Firm*—James B. Middleton

[57] ABSTRACT

A seismically triggered valve is designed to shut off gas supply during an earthquake. A valve member is pivoted within a valve body, the valve member being mechanically movable to the open position. A magnet is fixed to the valve member, and a ferromagnetic ball is free on a concave surface. The center of the concave surface is aligned with the magnet; but, when the valve is shaken, the ball moves and releases the magnet. The valve member moves by gravity, but is assisted by a spring bias towards the closed position. A control rod can engage the valve member to open the valve, and can mechanically close the valve if desired. Further, a bleed passage connecting the valve body with the outlet is controlled by the control rod selectively to bleed off pressure within the valve body. The valve body is formed integrally, with an open top, and the sensor is received within the open top to close the top and properly locate the sensor.

5 Claims, 2 Drawing Sheets

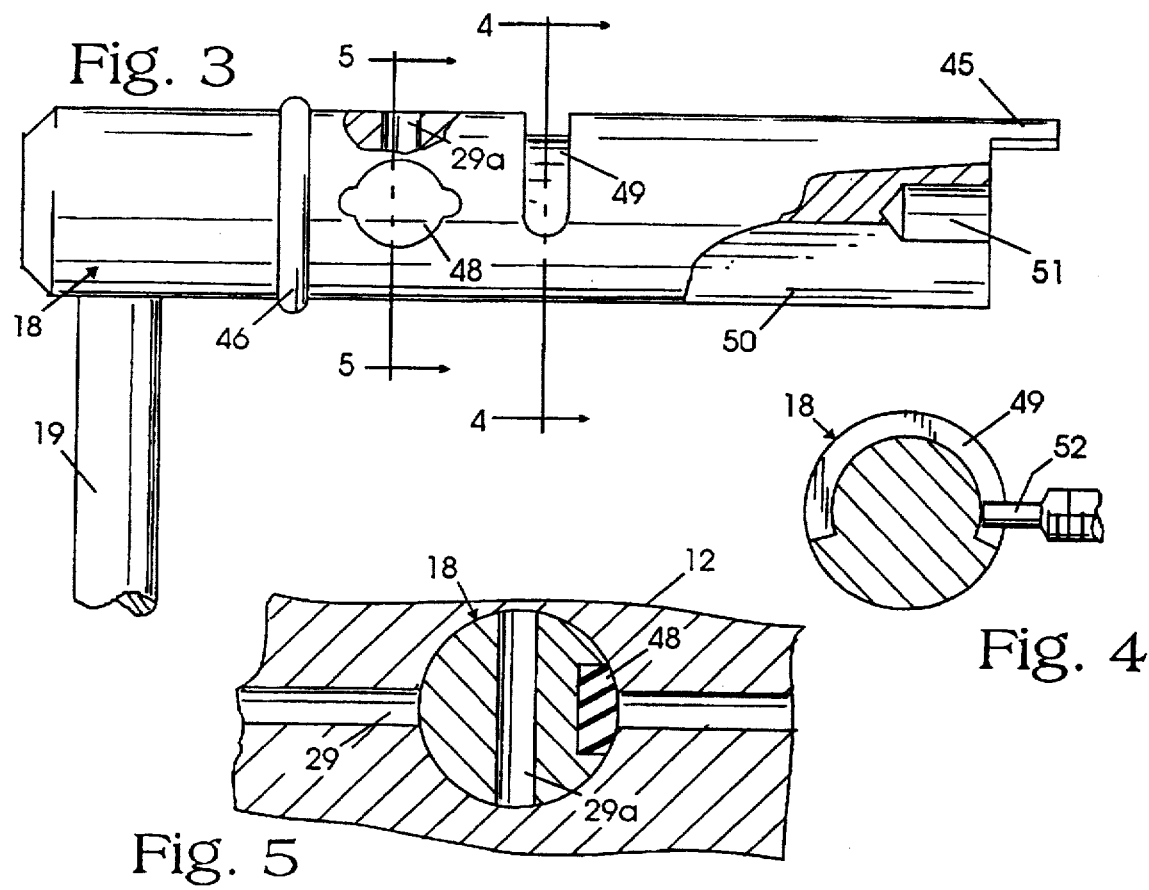
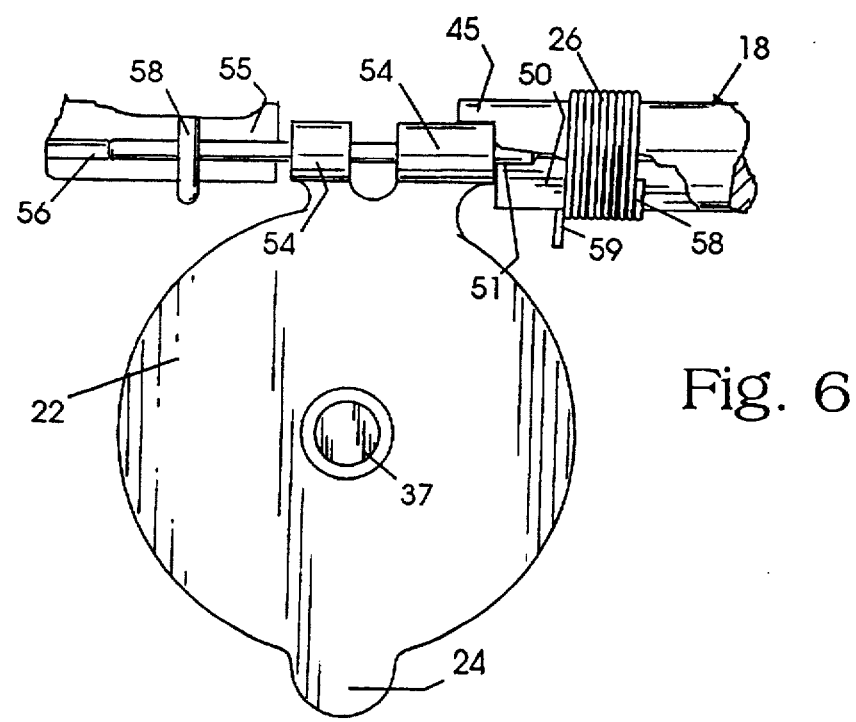

1

SEISMICALLY TRIGGERED VALVE

BACKGROUND OF THE INVENTION

1. Field of the Invention

This invention relates generally to automatically operable valves, and is more particularly concerned with a valve that is automatically closable on occurrence of a seismic event of a predetermined severity.

2. Discussion of the Prior Art

In areas of the world in which earthquakes, or seisms, are reasonably expectable there is concern for collateral damage flowing from the seism. By way of example, even though a relatively slight amount of damage may be caused to a structure, it is possible that a gas line will be broken, and major damage may be caused by a gas explosion. Similarly, toxic or otherwise hazardaous gases may be released into the atmosphere. In an effort to prevent collateral damage, there have been automatically operable valves and the like to terminate the flow of gas or other fluids early in the occurrence of the seismic event.

The prior art valves have generally been rather complex mechanically, frequently including one or more linkages that must be operated to open or close the valve. Other valves may be somewhat simpler, but none of the prior art valves is easily variable so that severity of the seism required to operate the valve can be changed at will. One exception to the last statement is the U.S. Pat. No. 5,115,829 to Franzke. This patent discloses a rather simple automatically operable valve, the sensitivity of which is relatively easy to change. However, the Franzke patent is somewhat crudely done, with a housing fabricated from sheet stock, and the device does not lend itself to mass manufacture or efficient operation.

SUMMARY OF THE INVENTION

The present invention provides a seismically triggered valve having a unitary body, and a valve member pivotal between a valve-closed position and a valve-open position. The valve member is biased towards a valve-closed position; and, in the valve-open position, is held in place by magnetic attraction with a movable sensor member. The sensor member is moved by seismic activity to release the valve member to allow the valve member to move to a valveclosed position. The movable member comprises a ferromagnetic ball or the like within a spherical recess, the arrangement being that the ball will tend to be centered in the lowest portion of the spherical recess, but can be easily moved from that position by shaking the valve. Further, the construction of the spherical recess is simple to make and assemble, while providing positive sealing of the valve body.

There is a mechanical means to reset the valve, which is to say to move the valve member to the valve-open position. The mechanical means includes a "bleed" position whereby high pressure within the valve body can be bled off before attempting to open the valve. The same mechanical means includes the valve member biasing, and also controls the positioning of the valve member, so the mechanical means can be thought of as a control rod.

BRIEF DESCRIPTION OF THE DRAWINGS

These and other features and advantage of the present invention will become apparent from consideration of the following specification when taken in conjunction with the accompanying drawings in which.

2

Figure 1:
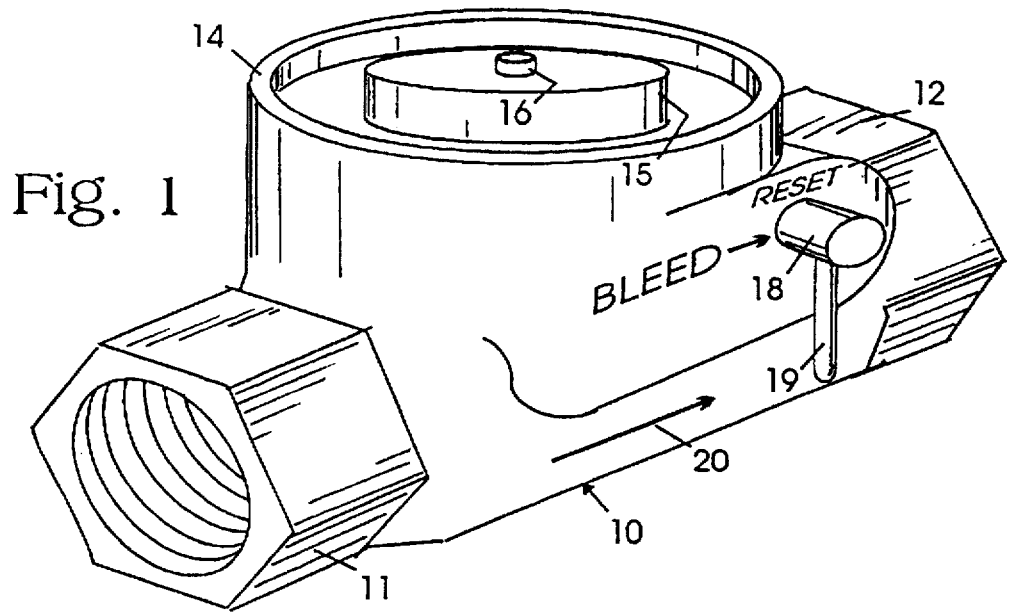
FIG. 1 is a perspective view showing one form of valve made in accordance with the present invention.
Figure 2:
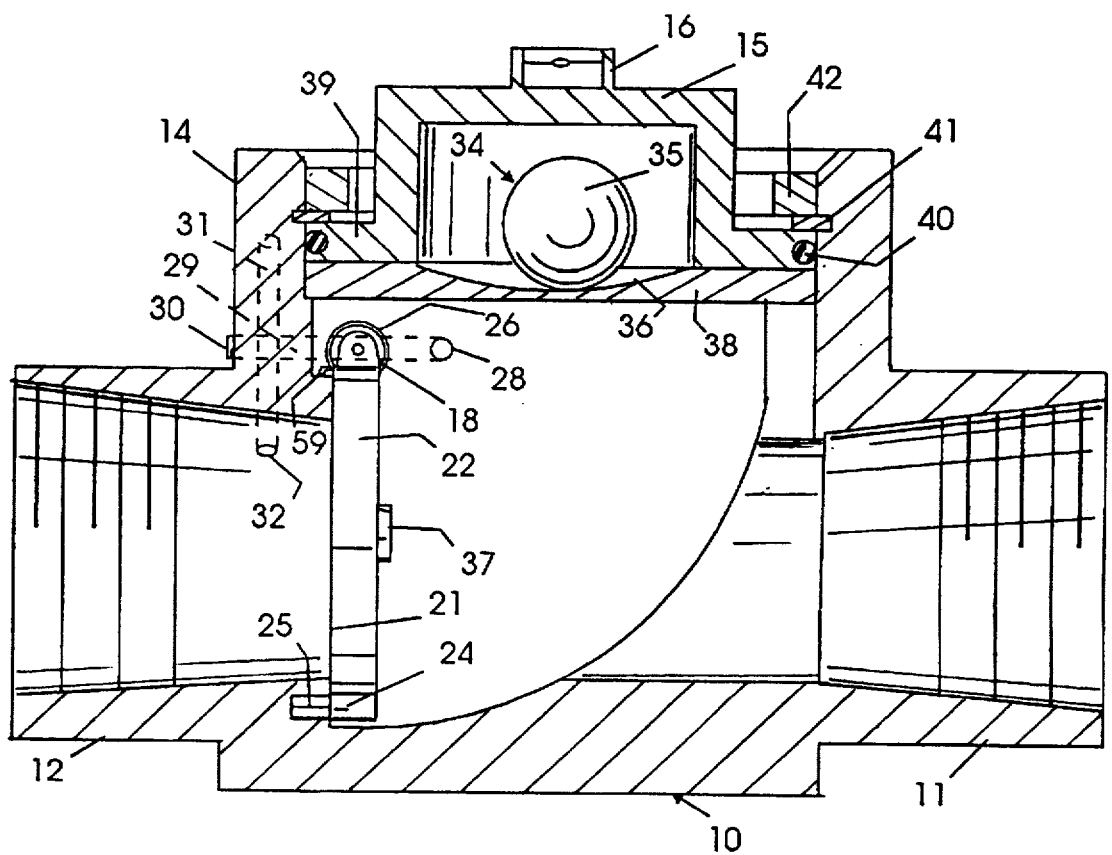

FIG. 2 is a longitudinal cross-sectional view through the valve of FIG. 1;

FIG. 3 is an enlarged side elevational view of a control rod for use in the valve shown in FIGS. 1 and 2;

FIG. 4 is a cross-sectional view taken along the line 4—4 in FIG. 3, and showing a fragmentary portion of the valve body therewith;

FIG. 5 is a cross-sectional view taken along the line 5—5 in FIG. 3, and showing a portion of a screw cooperating with the control rod; and, FIG. 6 is a rear elevational view of the valve member for the device of FIGS. 1 and 3 and illustrating the mounting thereof

DETAILED DESCRIPTION OF THE EMBODIMENT

Referring now more particularly to the drawings and to that embodiment of the invention here presented by way of illustration, the device shown in FIG. 1 includes a central valve body 10 with internally threaded inlet 11 and outlet 12. The upper portion of the valve body 10 has a circular portion 14 for receiving the valve member, which will be discussed hereinafter. Centrally of the circular portion 14 there is a sensor housing and a level 16.

On the side of the valve shown in FIG. 1 it will be seen that there is a rod 18 projecting from the valve, with an operating handle 19 generally perpendicular thereto.

It should be understood that the present invention utilizes the basic structure of the valve disclosed in U.S. Pat. No. 5,115,829, and constitutes an improvement thereof. The complete disclosure of U.S. Pat. No. 5,115,829 is incorporated herein by this reference. Such patent will be hereinafter referred to as the '829 patent.

With the '829 patent in mind, it should be understood by those skilled in the art that the valve shown in FIG. 1 has an inlet 11 and outlet 12, and fluid flow through the valve is in the direction indicated by the arrow 20. The rod 18 includes reset means, but the particular reset means is different from that shown in the '829 patent.

For a better understanding of the valve of the present invention, attention is directed to FIG. 2 of the drawings. In FIG. 2 it should be noticed that the inlet 11 is on the right and the outlet 12 is on the left. Fluid flow is therefore from right to left.

The outlet 12 is shown as having a tapered pipe thread; and, the opening in the outlet continues to taper to provide a valve seat 21. In FIG. 2, a valve member 22 is shown in position against the seat 21 to close the valve to prevent fluid flow therethrough. At the lower end of the valve member 22 as shown in FIG. 2 there is an extension 24 which aligns with a magnet 25 adjacent to the valve seat 21. It will be understood that, when the valve 22 is in closed position, the magnet 25 assists in holding the valve member 22 against the valve seat 21.

In addition to the magnet to hold the valve member 22 closed, there is a spring, means 26 that constantly biases the valve member 22 towards its closed position. The construction of the spring means 26 will be described in more detail below.

Adjacent to the rod 18, in FIG. 2 of the drawings, there is a bleed opening designated at 28. From the opening 28, a longitudinal bleed passage is shown in broken lines at 29. The forward end of the passage 29 is closed by a set screw 30. An angled bleed passage 31 intersects the passage 29, and opens into the outlet 12, at 32. The outer (or upper, as here illustrated ) end of the passage 31 is closed by a set screw or the like. Thus, fluid may pass from the central body 12, through the bleed opening 28 and into the longitudinal bleed passage 31, and out the opening 32. The rod 18 controls the flow through the passage 29 to control fluid flow through the bleed opening, and this will be described later.

The sensor 34 within the sensor housing 15 will be recognized from the '829 patent, but the overall construction has been changed, and the sensor 34 has been changed somewhat. Looking first at the sensor 34, the sensor is made of a sensor ball 35, received within a recess 36. In the '829 patent, the recess for the sensor element is conical, whereas the present recess 36 is spherical. While the conical recess can be operable, the spherical surface provides initially low resistance to the displacement of the ball 35, with increasing resistance as the ball 35 is displaced further from the center.

It will be remembered from the '839 patent that the valve member 22 is held in its open position by attraction between a magnet 37 on the valve member 22 and the sensor ball 35, which is of ferromagnetic material. Thus, the magnetic attraction must be overcome for the ball 35 to move off center. The small resistance offered by the spherical recess 36 added to the magnetic resistance is sufficient to prevent premature activation of the sensor, and the higher resistance offered by the conical recess is not required.

Still looking at FIG. 2 of the drawings, it can be seen that the housing of the valve is an integral member including the central body 10, inlet 11 and outlet 12, and circular portion 14. The circular portion 14 receives, and is closed by, the sensor housing 15 and the sensor plate 38 which defines the recess 36. Thus, the sensor plate 38 rests on appropriate shoulders within the circular portion 14, and the sensor ball 35 rests within the recess 36. The sensor housing 15 includes a cylindrical portion covering the sensor ball 35, and includes a flange 39 sealed within the circular portion 14 by O-rings 40. The housing flange 39 is held in place by a locking ring 41; and, a ring 42 covers the locking ring 41 for a better appearance.

Centrally of the sensor housing 15 there is a bubble level 16 of a type well known. The level 16 allows one installing the valve to be sure the valve is level for best operation.

Attention is next directed to FIGS. 3–6 for a better understanding of the construction and operation of the control rod 18. As is shown in FIG. 3, the control rod 18 is generally a cylindrical member having a perpendicular handle 19 on one end, and a longitudinal extension 45 on the other. Between the two ends, there are an O-ring 46, a diametrical passage 29a and a stopper 48, a rotational control groove 49, a saw cut 50, and a central bore 51.

The O-ring 46 surrounds the control rod 18 in order to seal the opening in which the rod 18 is inserted. Since the interior of the valve will be pressurized when in use, and the hole which receives the rod is in communication with the interior of the valve, a seal is necessary to prevent leakage. There is an appropriate circumferential groove in the rod 18 to receive the O-ring 46 as is well understood in the art.

The passage 29a is in the path of the longitudinal bleed passage 29 such that, when the rod is appropriately rotated, the passage 29a will be coaxial with the passage 29. As is shown in FIGS. 3 and 5, the passage 29a extends vertically, as does the handle 19.

Thus, if the handle 19 is rotated 90 degrees to be aligned with the "Bleed" and arrow (FIG. 1), the passage 29a will be horizontal and will be aligned with the passage 29. With these conditions, fluid can flow through the bleed opening 28, through the passages 29 and 29a, then to the angled passage 31 and out the opening 32.

Looking again at FIGS. 3 and 5, it will be seen that when the control rod 18 is positioned in the normal position as shown in FIG. 1, the passage 29a is not aligned with the passage 29, and the intent is to have no fluid flow through the passage 29. Those skilled in the art will understand that the metal-against-metal of the rotatable rod 18 and valve body 10 will generally not provide a tight enough fit to prevent some leakage of fluid around the rod 18. To resolve that difficulty, the stopper 48 is received within a cavity within the rod 18 and aligned with the downstream side of the passage 29 when the control rod 18 is in its normal position. By sealing the passage 29 as shown in FIG. 5, fluid is prevented from passing therethrough.

It will be remembered that the valve member 22 is biased towards a valve-closed position. This bias is from the control rod which is urged in one direction by the spring 26. To limit the rotation of the control rod 18 there is a control groove 49 as shown in FIGS. 3 and 4. A control screw 51 threadedly engages an appropriate hole in the valve body 12 so the tip of the screw 51 is within the groove 49. As a result, rotation of the control rod 18 is limited by the circumferential length of the control groove 49.

Turning now to FIG. 6 of the drawings, the arrangement of the valve member 22 should be understood. The valve body 22 includes hinge barrels 54, here shown as two spaced barrels, though it will be understood that one single barrel could be used. The barrels 54 receive a pintle 55 therethrough, the pintle 55 extending from within the bore of the rod 18, through the barrels 54 and into a slot 56. A pin 58 is adjacent to the slot 56 to retain the pintle 55.

The spring 26 extends around the control rod 18. The saw cut 50 of the rod 18 receives a radially extending end 58 of the spring 26 so this end of the spring, is fixed with respect to the rod 18. The opposite end of the spring 26 has a tail 59 that is received by a hole in the valve body 12, so this end of the spring 26 is fixed with respect to the valve body. The longitudinal extension 45 of the rod 18 extends over the barrel 54 and causes rotation of the barrel 54 as the rod 18 rotates. Thus, by tensioning the spring 26 properly, the valve member 22 will be urged towards the closed position.

When assembling the valve of the present invention, it will be understood that the control rod 18 must be inserted longitudinally into its receiving hole in the valve body. Meanwhile, the valve member 22 must be put into place, and pintle 55 passed through the barrel 54 and into the bore 51. It would be difficult to assemble all these parts if the pintle 55 were held rigidly by the valve body 10. To resolve the difficulty, the slot 56 is open so the pintle 55 can easily be installed. Once this portion of the assembly is complete, the member 38 is put into place, and a pin 58 carried by the member 38 extends down to hold the pintle 55 within the groove 56.

With the above and foregoing description in mind, it should be understood that the present invention provides an improved seismically operated valve that is well designed for mass manufacture and ease in operation. The control rod 18 provides a single means for manually closing the valve and manually opening the valve. The extension is slidable around the hinge barrel for free movement of the control rod, but engages the valve member when sufficiently rotated for opening or closing the valve. The bleed means can be used to reduce internal valve pressure before attempting to open the valve. The sensor means of the present device is sensitive, and the sensitivity can be easily changed by changing the radius of the spherical recess 36, or by changing the diameter of the sensor ball 35 (hence, changing the inertia). Since the valve member is spring-urged towards a closed position, tile valve of the present invention may operate when not completely level.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

What is claimed as invention is:

1. An automatically operable valve comprising a valve body, an inlet for admitting fluid to said valve body, and an outlet for allowing fluid to exit from said valve body, a valve member for closing said outlet, said valve member being movable from a first position in which said outlet is open to a second position in which said outlet is closed, seismically sensitive magnetic means for holding said valve member in said first position, said valve member being movable to said second position on activation of said seismically sensitive magnetic means, and mechanical means for selectively moving said valve member from said second position to said first position, said seismically sensitive magnetic means including a magnet carried by said valve member, a concave surface having an apex at its lowest point, said apex being juxtaposed over said magnet carried by said valve member when said valve member is in said first position, a ferromagnetic ball received on said concave surface, and bleed means for selectively connecting said valve body to said outlet, said bleed means comprising a bleed opening defined in said valve body, a bleed passage defined in said valve body in communication with said bleed opening and said outlet, and means for selectively opening and closing said bleed passage, and including a control rod fixed to said valve member for mechanically moving said valve member, said control rod constituting said mechanical means for selectively moving said valve member from said second position to said first position, said control rod having a normal position and means for biasing said control rod towards said normal position wherein, said control rod defines a diametrical passage there through, said diametrical passage being alienable with said bleed passage on rotation of said control rod from said normal position.

2. An automatically operable valve as claimed in claim 1, and further including a stopper carried by said control rod and aligned with said bleed passage when said control rod is in said normal position.

3. An automatically operable valve as claimed in claim 1, wherein said valve member includes a hinge barrel, and said control rod includes an extension engaging said hinge barrel so that rotation of said control rod moves said valve member only on engagement of said extension with said valve member.

4. An automatically operable valve as claimed in claim 3, said control rod further defining a control groove, and a screw within said control groove for defining said normal position of said control groove.

5. An automatically operable valve as claimed in claim 1, wherein said concave surface is spherical.

* * * * *